US010986032B2

(12) United States Patent
Ohta et al.

(10) Patent No.: US 10,986,032 B2
(45) Date of Patent: Apr. 20, 2021

(54) RADIO COMMUNICATION DEVICE AND RADIO COMMUNICATION METHOD FOR SWITCHING FROM DUAL CONNECTIVITY TO SINGLE CONNECTIVITY

(71) Applicant: FUJITSU LIMITED, Kawasaki (JP)

(72) Inventors: Yoshiaki Ohta, Yokohama (JP); Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/269,372

(22) Filed: Sep. 19, 2016

(65) Prior Publication Data

US 2017/0012887 A1  Jan. 12, 2017

Related U.S. Application Data

(63) Continuation of application No. PCT/JP2014/057915, filed on Mar. 20, 2014.

(51) Int. Cl.
*H04L 12/801* (2013.01)
*H04W 76/15* (2018.01)
(Continued)

(52) U.S. Cl.
CPC ............ *H04L 47/34* (2013.01); *H04L 1/1614* (2013.01); *H04L 1/188* (2013.01); *H04L 43/08* (2013.01);
(Continued)

(58) Field of Classification Search
CPC ....... H04L 47/34; H04L 1/1614; H04L 1/188; H04L 43/08; H04L 2001/0096;
(Continued)

(56) References Cited

U.S. PATENT DOCUMENTS 6,545,981 B1 *  4/2003  Garcia ................ G06F 12/0292
                                             370/242
9,706,418 B2 *  7/2017  Decarreau ............. H04W 24/02
(Continued)

FOREIGN PATENT DOCUMENTS

JP   2011-514033 A    4/2011
KR   10-2009-0122030 A   11/2009
(Continued)

OTHER PUBLICATIONS

Extended European search report with supplementary European search report and the European search opinion issued by the European Patent Office for corresponding European Patent Application No. 14886402.8, dated Mar. 20, 2017.
(Continued)

*Primary Examiner* — Ivan O Latorre
(74) *Attorney, Agent, or Firm* — Myers Wolin, LLC

(57) ABSTRACT

A radio communication device includes a reception unit that receives a part of data transmitted from a first communication device, via a first path including a radio channel between the radio communication device and the first communication device and that receives another part of data transmitted from the first communication device, via a second path that goes through a second communication device; a control unit that performs communication control in accordance with a state of data communication performed via the second path; and a transmission unit that transmits, to the first communication device via the first path by using control performed by the control unit in accordance with the state of the data communication performed via the second path, reception state information that specifies data that has been received or data that has not been received by the reception unit.

12 Claims, 9 Drawing Sheets

(51) Int. Cl.
| | |
|---|---|
| *H04W 28/18* | (2009.01) |
| *H04L 1/16* | (2006.01) |
| *H04L 1/18* | (2006.01) |
| *H04L 12/26* | (2006.01) |
| *H04W 28/02* | (2009.01) |
| *H04W 28/04* | (2009.01) |
| *H04L 1/00* | (2006.01) |
| *H04W 84/04* | (2009.01) |
| *H04W 92/20* | (2009.01) |

(52) U.S. Cl.
CPC ....... *H04W 28/0205* (2013.01); *H04W 28/04* (2013.01); *H04W 28/18* (2013.01); *H04W 76/15* (2018.02); *H04L 43/0811* (2013.01); *H04L 2001/0096* (2013.01); *H04W 84/045* (2013.01); *H04W 92/20* (2013.01)

(58) Field of Classification Search
CPC .......... H04L 43/0811; H04W 28/0205; H04W 28/04; H04W 76/025; H04W 28/18; H04W 84/045; H04W 92/20
See application file for complete search history.

(56) References Cited

U.S. PATENT DOCUMENTS

| | | | | |
|---|---|---|---|---|
| 2006/0007862 | A1* | 1/2006 | Sayeedi | H04L 47/10 370/235 |
| 2007/0072612 | A1* | 3/2007 | Haraguchi | H04W 36/02 455/436 |
| 2007/0217432 | A1 | 9/2007 | Molisch et al. | |
| 2008/0192696 | A1* | 8/2008 | Sachs | H04W 36/02 370/331 |
| 2009/0061876 | A1* | 3/2009 | Ho | H04W 99/00 455/436 |
| 2009/0196191 | A1* | 8/2009 | Fischer | H04L 1/1614 370/252 |
| 2009/0262678 | A1 | 10/2009 | Oyman et al. | |
| 2010/0189075 | A1* | 7/2010 | Iwamura | H04W 36/0055 370/331 |
| 2010/0248726 | A1* | 9/2010 | Kagimoto | H04W 36/02 455/437 |
| 2011/0243085 | A1 | 10/2011 | Seo et al. | |
| 2011/0261745 | A1* | 10/2011 | Bontu | H04B 7/15592 370/315 |
| 2012/0202502 | A1* | 8/2012 | Wu | H04W 8/12 455/436 |
| 2015/0043435 | A1* | 2/2015 | Blankenship | H04L 69/322 370/329 |
| 2015/0133122 | A1* | 5/2015 | Chen | H04W 36/305 455/436 |
| 2015/0223282 | A1* | 8/2015 | Vajapeyam | H04L 1/20 370/221 |
| 2016/0249232 | A1* | 8/2016 | Uchino | H04L 1/1832 |
| 2016/0255675 | A1* | 9/2016 | Van Lieshout | H04W 76/25 370/329 |
| 2016/0262149 | A1* | 9/2016 | Futaki | H04W 92/20 |

FOREIGN PATENT DOCUMENTS

| | | |
|---|---|---|
| KR | 10-2010-0082287 A | 7/2010 |
| WO | 2009/099265 A1 | 8/2009 |
| WO | 2011/155256 A1 | 12/2011 |

OTHER PUBLICATIONS

Hoshyar et al, "Performance Evaluation of HARQ Schemes for Cooperative Regenerative Relaying", IEEE copyright 2009.
3GPP TS 36.300 V12.0.0 "3rd Generation Partnership Project;Technical Specification Group Radio Access Network; Evolved Universal Terrestrial Radio Access (E-UTRA)and Evolved Universal Terrestrial Radio Access Network(E-UTRAN);Overall description;Stage 2(Release 12)", Dec. 2013.
3GPP TS 36.211 V12.0.0 "3rd Generation Partnership Project;Technical Specification Group Radio Access Network; Evolved Universal Terrestrial Radio Access (E-UTRA);Physical channels and modulation (Release 12)", Dec. 2013.
3GPP TS 36.212 V12.0.0 "3rd Generation Partnership Project;Technical Specification Group Radio Access Network; Evolved Universal Terrestrial Radio Access (E-UTRA);Multiplexing and channel coding (Release 12)", Dec. 2013.
3GPP TS 36.213 V12.0.0 3rd Generation Partnership Project;Technical Specification Group Radio Access Network; Evolved Universal Terrestrial Radio Access (E-UTRA);Physical layer procedures(Release 12), Dec. 2013.
3GPP TS 36.321 V12.0.0 "3rd Generation Partnership Project;Technical Specification Group Radio Access Network; Evolved Universal Terrestrial Radio Access (E-UTRA);Medium Access Control (MAC) protocol specification(Release 12)", Dec. 2013.
3GPP TS 36.322 V11.0.0 "3rd Generation Partnership Project;Technical Specification Group Radio Access Network; Evolved Universal Terrestrial Radio Access (E-UTRA);Radio Link Control (RLC) protocol specification(Release 11)", Sep. 2012.
3GPP TS 36.323 V11.2.0 "3rd Generation Partnership Project;Technical Specification Group Radio Access Network; Evolved Universal Terrestrial Radio Access (E-UTRA);Packet Data Convergence Protocol (PDCP) specification(Release 11)", Mar. 2013.
3GPP TS 36.331 V12.0.0 "3rd Generation Partnership Project;Technical Specification Group Radio Access Network; Evolved Universal Terrestrial Radio Access (E-UTRA);Radio Resource Control (RRC); Protocol specification(Release 12)", Dec. 2013.
3GPP TS 36.413 V12.0.0 "3rd Generation Partnership Project;Technical Specification Group Radio Access Network; Evolved Universal Terrestrial Radio Access Network(E-UTRAN);S1 Application Protocol (S1AP)(Release 12)", Dec. 2013.
3GPP TS 36.423 V12.0.0 "3rd Generation Partnership Project;Technical Specification Group Radio Access Network; Evolved Universal Terrestrial Radio Access Network (E-UTRAN);X2 application protocol (X2AP)(Release 12)", Dec. 2013.
3GPP TR 36.842 V12.0.0 "3rd Generation Partnership Project;Technical Specification Group Radio Access Network; Study on Small Cell enhancements for E-UTRA and E-UTRAN;Higher layer aspects(Release 12)", Dec. 2013.
International Search Report with Written Opinion of the International Searching Authority issued for corresponding International Patent Application No. PCT/JP2014/057915, dated Jun. 24, 2014, with an English translation.
Notice of Preliminary Rejection issued by the Korean Intellectual Property Office for corresponding Korean Patent Application No. 10-2016-7025856, dated Jul. 17, 2017, with English translation.
Intel Corporation, "PDCP reordering for option 3C in dual connectivity", Agenda Item: 7.2.1, 3GPP TSG-RAN WG2 Meeting #85, R2-140269, Prague, Czech Republic, Feb. 10-14, 2014.
Notice of Preliminary Rejection issued by the Korean Intellectual Property Office for corresponding Korean Patent Application No. 10-2018-7011785, dated Jul. 3, 2018, with English translation.
Pantech, "Signal flow modeling of SeNB change on dual connectivity", Agenda Item: 7.2.2.1, 3GPP TSG-RAN WG2 Meeting #84, R2-134341, San Francisco, USA, Nov. 11-15, 2013.
First Notification of Office Action issued by the China National Intellectual Property Administration for corresponding Chinese Patent Application No. 201480077338.5, dated Dec. 25, 2018, with an English translation.
Notification of Reasons for Refusal issued by the Japan Patent Office for corresponding Japanese Patent Application No. 2016-508437, dated Jul. 3, 2018, with an English translation.
Broadcom Corporation, "SCG handover for Dual Connectivity," Agenda Item 7.2.1, 3GPP TSG-RAN WG2, Meeting #85, R2-140424, Prague, Czech Republic, Feb. 10-14, 2014.
Mediatek Inc., "Signaling Procedure for Dual Connectivity," Agenda Item 7.2.1, 3GPP TSG-RAN2, Meeting #85, R2-140196, Prague, Czech Republic, Feb. 10-14, 2014.
Ericsson, "Dual Connectivity—non-mobility scenarios," Agenda Item 20.1, 3GPP TSG-RAN WG3, Meeting #83, R3-140344, Prague, Czech Republic, Feb. 10-14, 2014.

(56) References Cited

OTHER PUBLICATIONS

Japanese Office Action issued for corresponding Japanese Patent Application No. 2016-508437, drafted Jul. 23, 2019 and dated Jul. 30, 2019, with English translation.
Huawei, "X2 Signalling to Support Dual Connectivity," Agenda Item: 20.1, 3GPP TSG-RAN WG3 Meeting #83, R3-140118, Feb. 10-14, 2014, Prague, Czech Republic.
Notice of Reasons for Refusal issued by the Japan Patent Office for corresponding Japanese Patent Application No. 2019-105746, dated May 19, 2020, with a full English machine translation.
Huawei et al., "PDCP Reordering Operation for the Alternative 3C", Agenda Item: 7.2.1, 3GPP TSG-RAN WG2 Meeting #85, R2-140053, Prague, Czech Republic, Feb. 10-14, 2014.
Trial and Appeal Decision for Appeal 2019-7524, issued for corresponding Japanese Patent Application No. 2016-508437, mailed on Feb. 12, 2020, with English translation.
Huawei, "Data Transmission to Support Dual Connectivity UP 3C," Agenda Item: 20.2, 3GPP TSG-RAN WG3 Meeting #83, R3-140120, Feb. 10-14, 2014, Prague, Czech Republic.
3GPP TR 36.842 V1.0.0, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", Nov. 2013.
Decision of Refusal issued by the Japan Patent Office for corresponding Japanese Patent Application No. 2019-105746, dated Jan. 5, 2021, with an English translation.
Communication pursuant to Article 94(3) EPC issued by the European Patent Office for corresponding European Patent Application No. 14 886 402.8-1207, dated Jan. 13, 2021.

* cited by examiner

FIG.5

| Bit | Description |
|---|---|
| 000 | PDCP status report |
| 001 | Interspersed ROHC feedback packet |
| 010-111 | Reserved |

RADIO COMMUNICATION DEVICE AND RADIO COMMUNICATION METHOD FOR SWITCHING FROM DUAL CONNECTIVITY TO SINGLE CONNECTIVITY

CROSS-REFERENCE TO RELATED APPLICATION

This application is a continuation of International Application No. PCT/JP2014/057915, filed on Mar. 20, 2014 and designating the U.S., the entire contents of which are incorporated herein by reference.

FIELD

The embodiments discussed herein are directed to a radio communication device and a radio communication method.

BACKGROUND

Conventionally, in order to increase transmission capacity in a radio communication system (hereinafter, referred to as "system capacity"), various devices are designed. For example, in the $3^{rd}$ Generation Partnership Project Radio Access Network Long Term Evolution (3GPP LTE), the technology related to increase the system capacity by making the most use of, in addition to macro cells, small cells (micro cell) is being discussed. Here, the cell indicates the range that is covered by a radio base station in order for a radio terminal to transmit and receive a radio signal. Furthermore, the macro cell is a cell that accommodates a base station and in which transmission electrical power is relatively high and the radio wave reach range is relatively large. Furthermore, the small cell is a cell that accommodates a base station in which transmission electrical power is relatively low and the radio wave reach range is relatively small.

In the 3GPP LTE-Advanced (LTE-A), as the configuration of a radio communication system, for example, the configuration in which a plurality of small cells is included in a macro cell is being studied. Furthermore, the technology in which a mobile station simultaneously connects a macro cell and a small cell is being studied. In addition, the technology in which a mobile station simultaneously connects two different small cells is being studied. In this way, communication in which a mobile station simultaneously connects two different cells and performs operations may sometimes be called dual connectivity (Dual Connectivity).

When a mobile station simultaneously connects to a macro cell and a small cell, for example, a signal of a control plane that includes therein control information on the layer 3, such as setting of a transmission path, control of handover, or the like, is transmitted and received to and from a base station in a macrocell (hereinafter, referred to as a "macro base station"). Furthermore, for example, a signal of a data plane that includes therein user data is transmitted and received to and from the macro base station and the base station in a small cell (hereinafter, referred to as a "small base station"). Here, the control plane may sometimes be called a control plane (Control Plane: C plane), a Signaling Radio Bearer (SRB), or the like. Furthermore, the data plane may sometimes be called a user plane (User Plane: U plane) or a DRB (Data Radio Bearer), or the like.

In contrast, when a mobile station simultaneously connects to two different small cells, for example, the signal of the control plane is transmitted and received to and from one of the small base stations and the signal of the data plane is transmitted and received to and from the other one of the small base stations. The signal of the data plane may also be transmitted and received to and from both the small base stations.

In such dual connectivity described above, a base station to which the control plane is connected may sometimes be called a primary base station. Furthermore, a base station that performs communication in cooperation with the primary base station and to which the data plane is connected may sometimes be called a secondary base station. Furthermore, these base stations may sometimes be called anchor radio base stations, assisting radio base stations, master radio base stations, or slave radio base stations. Furthermore, in the latest trend of LTE-A, these base stations are respectively called a master base station and a secondary base station. In the present application, the respective base stations may sometimes be called a first communication device and a second communication device.

Regarding sharing of functions with respect to a primary base station and a secondary base station in dual connectivity, various configurations are proposed in accordance with which of the layer is used to split a signal of the data plane. For example, there is the configuration in which a signal of the data plane is split in the previous stage of the Packet Data Convergence Protocol (PDCP) layer. Furthermore, for example, there is the configuration in which a signal of the data plane is split between the PDCP layer and the Radio Link Control (RLC) layer. Furthermore, for example, there is the configuration in which a signal of the data plane is split between the RLC layer and the Medium Access Control (MAC) layer. The configuration is not limited to these and it is also possible to use the configuration in which a signal of the data plane is split in each of the layers. Furthermore, for example, it is also possible to use the configuration in which some function performed in the PDCP layer is allocated to the primary base station and the rest of the function performed in the PDCP layer is allocated to the secondary base station. The same applied to the function of the RLC layer and the MAC layer. Furthermore, in the latest trend of LTE-A, it is supposed to use the configuration in which a signal of the data plane is split between the PDCP layer and the RLC layer (Architecture 3C) and the configuration in which each of the master base station and the small base station has the PDCP layer, the RLC layer, and the MAC layer (Architecture 1C).

The primary base station and the secondary base station that share the function are connected with each other by a wired or radio link. Then, the signal of the data plane that is split in the primary base station is transmitted to the secondary base station via this link.

Non Patent Literature 1: 3GPP TS36.300 V12.0.0 (2013-12), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2

Non Patent Literature 2: 3GPP T536.211 V12.0.0 (2013-12), 3rd Generation Partnership Project; Technical Specification Group Radio Access Network; Evolved Universal Terrestrial Radio Access (E-UTRA); Physical channels and modulation Non Patent Literature 3: 3GPP T536.212 V12.0.0 (2013-12), 3rd Generation Partnership Project; Technical Specification Group Radio Access Network; Evolved Universal Terrestrial Radio Access (E-UTRA); Multiplexing and channel coding Non Patent Literature 4: 3GPP TS36.213 V12.0.0 (2013-12), 3rd Generation Partnership Project; Technical Specification Group Radio Access Network; Evolved Universal Terrestrial Radio Access (E-UTRA); Physical layer procedures Non Patent Literature 5: 3GPP T536.321 V12.0.0 (2013-12), 3rd Generation Partnership Project; Technical Specification Group Radio Access Network; Evolved Universal Terrestrial Radio Access (E-UTRA); Medium Access Control (MAC) protocol specification Non Patent Literature 6: 3GPP T536.322 V11.0.0 (2012-09), 3rd Generation Partnership Project; Technical Specification Group Radio Access Network; Evolved Universal Terrestrial Radio Access (E-UTRA); Radio Link Control (RLC) protocol specification Non Patent Literature 7: 3GPP TS 36.323 V11.2.0 (2013-03), 3rd Generation Partnership Project; Technical Specification Group Radio Access Network; Evolved Universal Terrestrial Radio Access (E-UTRA); Packet Data Convergence Protocol (PDCP) specification Non Patent Literature 8: 3GPP T536.331 V12.0.0 (2013-12), 3rd Generation Partnership Project; Technical Specification Group Radio Access Network; Evolved Universal Terrestrial Radio Access (E-UTRA); Radio Resource Control (RRC); Protocol specification Non Patent Literature 9: 3GPP TS36.413 V12.0.0 (2013-12), 3rd Generation Partnership Project; Technical Specification Group Radio Access Network; Evolved Universal Terrestrial Radio Access Network (E-UTRAN); S1 Application Protocol (S1AP)

Non Patent Literature 10: 3GPP TS36.423 V12.0.0 (2013-12), 3rd Generation Partnership Project; Technical Specification Group Radio Access Network; Evolved Universal Terrestrial Radio Access Network (E-UTRAN); X2 Application Protocol (X2AP)

Non Patent Literature 11: 3GPP TR36.842 V12.0.0 (2013-12), 3rd Generation Partnership Project; Technical Specification Group Radio Access Network; Study on Small Cell enhancements for E-UTRA and E-UTRAN; Higher layer aspects However, when the dual connectivity is being performed, for example, if a communication state is changed in communication performed between the secondary base station and the mobile station, it is conceivable that a case of releasing the dual connectivity and switching to the single connectivity may occur. Namely, when the mobile station simultaneously connects the macro base station and the small base station, if the communication state between the mobile station and the small base station is changed, it is conceivable that the dual connectivity is released and the mobile station performs communication with only the macro base station. An example of a change of the communication state includes, for example, a failure related to data communication, the occurrence of an error, the degradation of the radio quality, or the like.

However, when the dual connectivity is being performed, because a signal of the data plane is transmitted from both the macro base station and the small base station, if a case of switching to the single connectivity occurs, duplication or a loss of user data may possibly occur in the mobile station. Namely, if a case of switching from the dual connectivity to the single connectivity occurs, the macro base station may sometimes transmit, in a duplicated manner, user data that has already been transmitted from the small base station or may sometimes make the user data loss without transmitting the user data that has not yet been transmitted from the small base station.

Furthermore, this problem occurs not only in a downlink, which is from the base station toward the mobile station, but also in an uplink, which is from the mobile station toward the base station. Namely, when the dual connectivity is being performed, the mobile station transmits the user data to both the macro base station and the small base station; however, after having switched to the single connectivity, the mobile station transmits the user data only to the macro base station. At this time, because the mobile station does not identify whether the user data that has already been transmitted to the small base station is transferred to the macro base station, it is difficult to transmit the user data with the proper quantity to the macro base station after having switched to the single connectivity. Similarly, in also a case in which the mobile station performs three or more multiple connectivity, inconsistency of user data that is transmitted and received after having switched to the single connectivity may sometimes occur.

SUMMARY

According to an aspect of an embodiment, a radio communication device includes a reception unit that receives a part of data transmitted from a first communication device, via a first path including a radio channel between the radio communication device and the first communication device and that receives another part of data transmitted from the first communication device, via a second path that goes through a second communication device; a control unit that performs communication control in accordance with a state of data communication performed via the second path; and a transmission unit that transmits, to the first communication device via the first path by using control performed by the control unit in accordance with the state of the data communication performed via the second path, reception state information that specifies data that has been received or data that has not been received by the reception unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating the list of the PDU type;

DESCRIPTION OF EMBODIMENTS

Preferred embodiments of a radio communication device and a radio communication method disclosed in the present invention will be explained with reference to accompanying drawings. Furthermore, the present invention is not limited to the embodiments. Furthermore, it goes without saying that each of the embodiments described below can be appropriately used in combination. In a description below, the embodiments related to downlink communication and uplink communication are described and, because the dual connectivity is often used in two-way direction communication in which both the downlink communication and the uplink communication are performed, it is obvious that each of the embodiments may also be performed in combination.

First Embodiment

Figure 1:
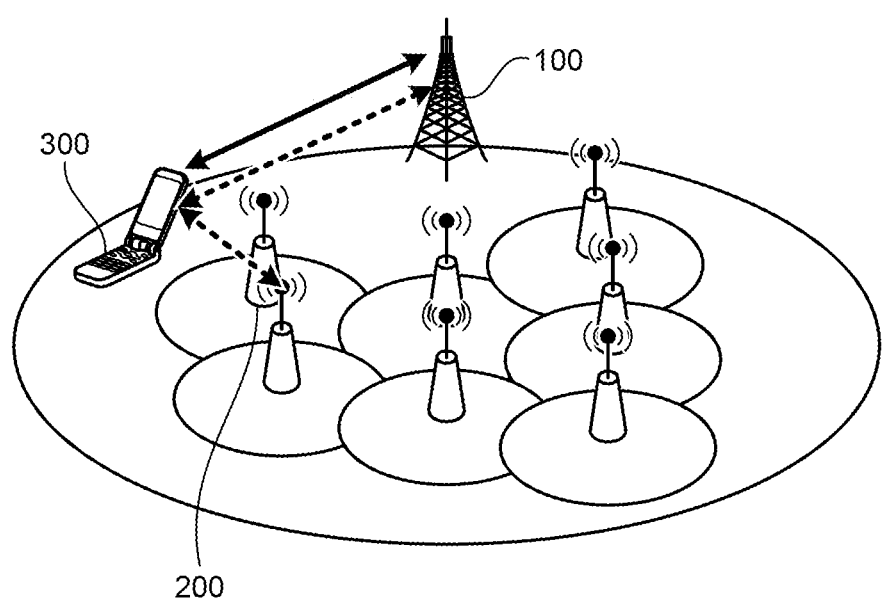
FIG. 1 is a schematic diagram illustrating a configuration example of a radio communication system according to a first embodiment.

FIG. 1 is a schematic diagram illustrating a configuration example of a radio communication system according to a first embodiment. The radio communication system illustrated in FIG. 1 includes a macro base station 100, small base stations 200, and a mobile station 300.

The mobile station 300 connects to the macro base station 100 as a primary base station. Accordingly, the mobile station 300 is connected to the macro base station 100 by the control plane, which is represented by the arrow indicated by the solid line, and by the data plane, which is represented by the arrows indicated by the broken lines, illustrated in FIG. 1. Furthermore, the mobile station 300 connects to the small base station 200 that functions as a secondary base station. Accordingly, the mobile station 300 is connected to the small base station 200 by the data plane.

[Configuration of the Radio Communication System]

Figure 2:
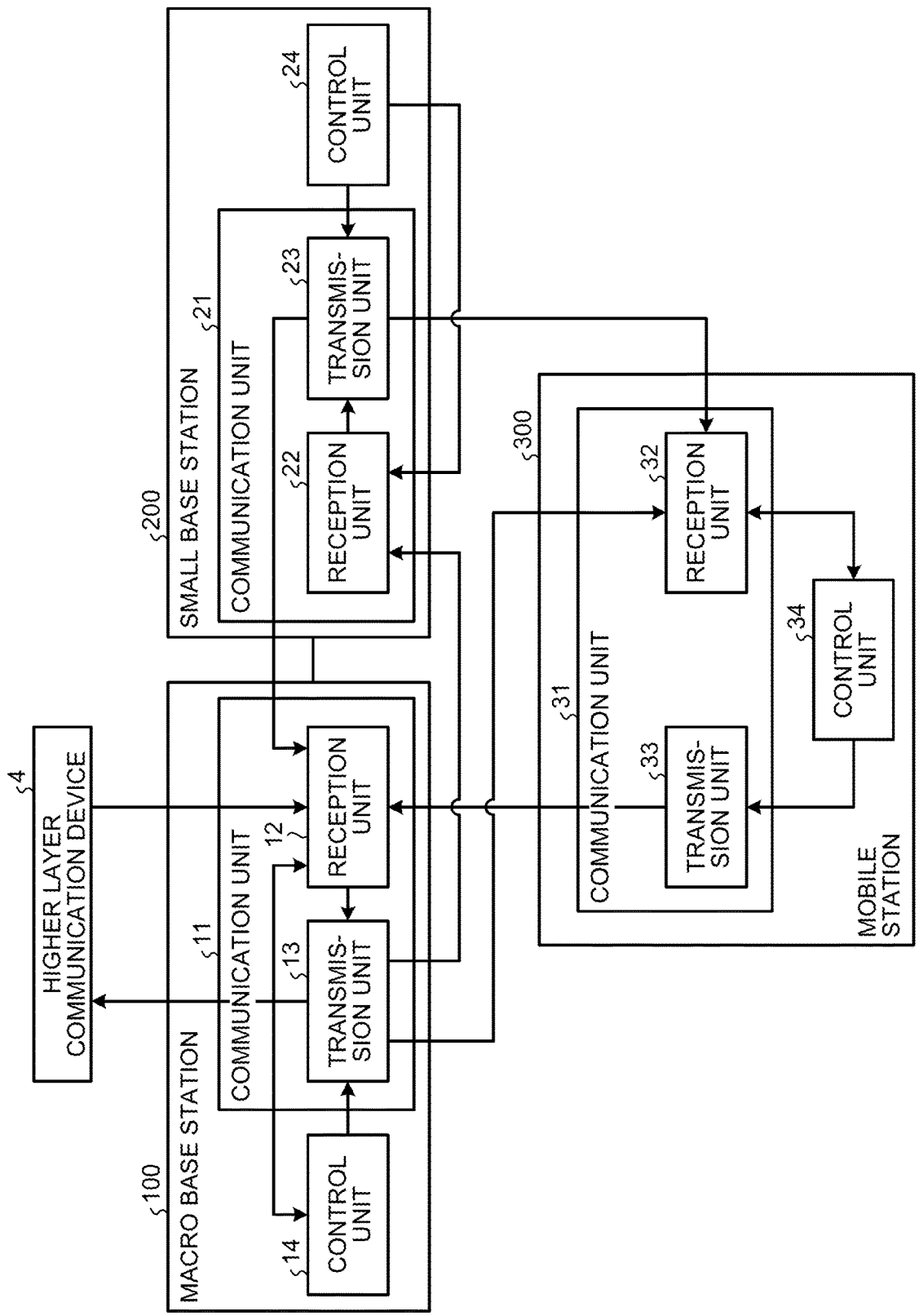
FIG. 2 is a block diagram illustrating the configuration of the radio communication system according to the first embodiment.

FIG. 2 is a block diagram illustrating the configuration of the radio communication system according to the first embodiment. As illustrated in FIG. 2, the macro base station 100 is connected to a higher layer communication device 4 and the macro base station 100 and the small base station 200 are connected by using, for example, an X2 interface, in a wired manner. Then, the macro base station 100 and the small base station 200 perform radio communication with the mobile station 300.

The macro base station 100 includes a communication unit 11 and a control unit 14. The communication unit 11 performs communication with the small base station 200, the mobile station 300, and the higher layer communication device 4. Namely, the communication unit 11 performs wired communication with the small base station 200 and the higher layer communication device 4 and performs radio communication with the mobile station 300.

Specifically, the communication unit 11 includes a reception unit 12 and a transmission unit 13. The reception unit 12 receives control data and user data from the higher layer communication device 4. Then, the reception unit 12 outputs the received control data and the user data to the transmission unit 13. Furthermore, the control data may also be data that is created by the macro base station 100 by itself.

The transmission unit 13 transmits, to the mobile station 300 as radio transmission, the control data that is addressed to the mobile station 300. Furthermore, in accordance with an instruction from the control unit 14, the transmission unit 13 transmits, to the mobile station 300 as radio transmission, a part of user data addressed to the mobile station 300 and transmits the rest of the user data to the small base station 200.

The control unit 14 performs the overall control of the operation of the communication unit 11 including the reception unit 12 and the transmission unit 13. Furthermore, the control unit 14 controls data communication in accordance with a communication state. When switching from the dual connectivity to the single connectivity, the control unit 14 refers to reception state information on the mobile station 300 received from the mobile station 300 and secures consistency of data with the mobile station 300.

Furthermore, as an example of switching to the single connectivity, for example, the following cases are used. First, an example includes a case of switching a communication partner from the current small base station 200 to another small base station (RRC reconfiguration including the SeNB change). Furthermore, an example includes a case in which, although the small base station 200 is still being set, data is transmitted to only the macro base station 100 and is not transmitted to the small base station 200 (RRC reconfiguration). Furthermore, an example includes a case in which the setting of the small base station 200 is deleted (RRC reconfiguration including the SeNB removal).

In the description above, regarding the timing at which the macro base station 100 receives the reception state information from the mobile station 300, for example, the following examples are present.

First Example

When the macro base station 100 switches from the dual connectivity to the single connectivity, a change in the setting is transmitted, as a notification, to the mobile station 300 by using the Radio Resource Control (RRC) signaling. Furthermore, similarly, a change in the setting is also transmitted, as a notification, to the small base station 200. It is possible to include, in the RRC signaling, an instruction indicated by the report on the reception state information. When the mobile station 300 receives the RRC signaling that includes therein the instruction indicated by the report on the reception state information, the mobile station 300 notifies the macro base station 100 of the reception state information.

Second Example

When the mobile station 300 detects a change in a communication state, the mobile station 300 transmits, at the time of detection as the trigger, the reception state information to the macro base station 100. The report on the reception state information may also previously be set in the RRC signaling. Here, the change in the communication state corresponds to, for example, the following cases. First, a case in which a data loss (a packet loss in the X2 interface, data disposal due to an overflow caused by traffic congestion in a small base station, transmission failure in a radio link, or the like) occurs in a transmission path (an X2 interface and a radio link) that is via the small base station 200 and thus desired data is not received in the mobile station 300 (detection is possible when a timer in the PDCP layer has expired) corresponds to the change in the communication state. Second, a case in which, retransmission of desired data transmission has failed in the RLC layer of the small base station 200 and degradation of the quality of the radio link (Radio Link Failure) is detected (detection is possible by a counter, in the RLC layer, in which the maximum number of retransmissions exceeds) corresponds to the change in the communication state. In this case, in addition to downlink transmission, transmission of an acknowledgment response that is associated with the downlink transmission (the RLC STATUS REPORT that is used to transmit ACK and NACK or an acknowledgment response of TCP if downlink communication is Transmission Control Protocol (TCP) communication) is likely to fail. Thus, if uplink communication has failed, a Radio link Failure is detected in the RLC layer of the mobile station 300. To summarize the above, the occurrence of a failure of communication in the transmission path via the small base station 200 at the time of dual connectivity is an example of a change in the communication state.

To summarize the above examples, there are three triggers at which the mobile station 300 transmits the reception state information. Namely, the first trigger is detection of a change in the downlink communication state in the mobile station 300 (detection of a state change in the wired link and the radio link is possible); the second trigger is detection of a change in the downlink communication state in the small base station 200 (detection of a state change in the radio link is possible); and the third trigger is detection of a change in the uplink communication state in the mobile station 300 (detection of a state change in the radio link is possible).

Third Example

The third example is an example in combination described above. Specifically, in the second example, at least one of the three changes in the communication states described in the second example is sent to the macro base station 100 as a notification and, if the macro base station receives the subject notification, a change in the setting is sent to the mobile station 300 as a notification by using the RRC signaling. At this point, the macro base station 100 can include, in the RRC signaling, the instruction indicated by the report on the reception state information. In this way, the macro base station 100 collectively controls the transmission timing of the reception state information, whereby it is possible for the mobile station 300 to avoid from simultaneously reporting the reception state information due to the trigger of the "change in the downlink communication state" and the trigger of the "change in the uplink communication state" described above.

In order to secure the consistency of data, the control unit 14 refers to the reception state information and performs control of transmission that is performed after having switched to the single connectivity such that the user data that has not yet been received by the mobile station 300 is to be transmitted and the user data that has already been received by the mobile station 300 is not to be transmitted.

Here, as a method of transmitting the user data that has not yet been received by the mobile station 300, the control unit 14 may also transmit the data stored in the macro base station 100 without processing anything or may also transmit the data that is sent back from the small base station 200 and that has not been transmitted to the mobile station 300 (the data that has not been transmitted by a packet scheduler and the data that has been transmitted by the packet scheduler but the delivery confirmation has not been checked) and may also transmit the data that is continuously received by the macro base station 100 (the data that is being transmitted over the X2 interface, which may also be referred to as fresh data).

As described above, according to the embodiment, when switching from the dual connectivity to the single connectivity, the macro base station receives, from the mobile station, the reception state information that specifies an unreceived packet and a received packet. At this point, the macro base station refers to the reception state information and performs control such that the packet that has not yet been received by the mobile station is to be transmitted and the packet that has already been received by the mobile station is not to be transmitted. Consequently, even if a case of switching a connection occurs, it is possible to transmit a packet from the macro base station to the mobile station in accordance with the reception state and it is possible to secure the consistency of data.

Furthermore, in the first embodiment described above, a description has been given of the downlink communication that is from the macro base station 100 toward the mobile station 300; however, it is also possible to perform the same process on the uplink communication that is from the mobile station 300 toward the macro base station 100. Namely, for example, in a case in which a communication failure occurs in an uplink transmission path via the small base station 200 at the time of dual connectivity, the macro base station 100 may also transmit the reception state information to the mobile station 300. Consequently, even in a case of the occurrence of switching to the single connectivity, it is possible to transmit a packet from the mobile station 300 to the macro base station 100 in accordance with the reception state and thus it is possible to secure the consistency of data.

Second Embodiment

The configuration example of a radio communication system according to a second embodiment is the same as that in the first embodiment (FIG. 1); therefore, descriptions thereof will be omitted. The radio communication system having this configuration is often used to reduce the traffic offload or the number of handovers.

[Configuration of the Radio Communication System]

The configuration of the radio communication system according to the second embodiment is the same as that in the first embodiment (FIG. 2); therefore, regarding the components having the same configuration as those in the first embodiment, descriptions thereof in detail will be omitted.

The macro base station 100 includes the communication unit 11 and the control unit 14. The communication unit 11 performs communication with the small base station 200, the mobile station 300, and the higher layer communication device 4. Specifically, the communication unit 11 includes the reception unit 12 and the transmission unit 13. The reception unit 12 receives control data and user data from the higher layer communication device 4. Then, the reception unit 12 outputs the received control data and the user data to the transmission unit 13.

Furthermore, if the small base station 200 detects an error (communication failure), the reception unit 12 receives an error detection notification from the small base station 200. Then, if the error detection notification is received, the reception unit 12 receives, from the mobile station 300 as radio reception, reception state information that specifies the user data that has already been received by the mobile station 300 and the user data that has not yet been received by the mobile station 300. Then, the reception unit 12 outputs the received error detection notification and the reception state information to the control unit 14. Furthermore, the timing at which the reception unit 12 receives the reception state information and the content of the reception state information will be described in detail later.

The transmission unit 13 transmits, to the mobile station 300 as radio transmission, the control data addressed to the mobile station 300. Furthermore, in accordance with an instruction from the control unit 14, the transmission unit 13 transmits, to the mobile station 300 as radio transmission, a part of user data addressed to the mobile station 300 and transmits the rest of the user data to the small base station 200.

The control unit 14 performs the overall control of the operation of the communication unit 11 including the reception unit 12 and the transmission unit 13. Furthermore, if the error detection notification is output from the reception unit 12, the control unit 14 decides to temporarily release the dual connectivity and switch to the single connectivity. Then, when the control unit 14 switches to the single connectivity, the control unit 14 refers to the reception state information that was output from the reception unit 12 and decides the user data that is to be transmitted to the mobile station 300 after switching to the single connectivity. Specifically, the control unit 14 refers to the reception state information and controls transmission that is performed after having switched to the single connectivity such that the user data that has not yet been received by the mobile station 300 is to be transmitted and the user data that has already been received by the mobile station 300 is not to be transmitted.

The small base station 200 includes a communication unit 21 and a control unit 24. The communication unit 21 performs communication with the macro base station 100 and the mobile station 300. Namely, the communication unit 21 performs communication with the macro base station 100 in a wired manner and performs radio communication with the mobile station 300.

Specifically, the communication unit 21 includes a reception unit 22 and a transmission unit 23. The reception unit 22 receives the user data from the macro base station 100 via the wired connection. Then, the reception unit 22 outputs the received user data to the transmission unit 23.

The transmission unit 23 transmits, to the mobile station 300 as radio transmission, the user data that is output from the reception unit 22 and that is addressed to the mobile station 300. Furthermore, if an error is detected in the communication with the mobile station 300, the transmission unit 23 transmits an error detection notification to the macro base station 100. The error detected here is, for example, an error indicating that a reception confirmation (ACK) of the user data is not received from the mobile station 300 even after the predetermined time has elapsed since the user data was transmitted to the mobile station 300, an error indicating that the number of retransmissions of the user data reaches the predetermined maximum number of retransmissions, or the like. Furthermore, in also a case in which an error is detected in the communication with the macro base station 100, the transmission unit 23 may also transmit the error detection notification to the macro base station 100.

The control unit 24 performs the overall control of the operation of the communication unit 21 including the reception unit 22 and the transmission unit 23.

The mobile station 300 includes a communication unit 31 and a control unit 34. The communication unit 31 performs communication with the macro base station 100 and the small base station 200. Namely, the communication unit 31 performs the dual connectivity with the macro base station 100 and the small base station 200 and simultaneously performs radio communication with both the base stations.

Specifically, the communication unit 31 includes a reception unit 32 and a transmission unit 33. The reception unit 32 receives, from the macro base station 100 as radio reception, the control data and the user data. At the same time, the reception unit 32 receives, from the small base station 200 as radio reception, the user data. Namely, the reception unit 32 directly receives, from the macro base station 100, a part of the user data transmitted from the macro base station 100 and receives, via the small base station 200, the rest of the part of the user data transmitted from the macro base station 100.

Furthermore, if an error is detected in the communication with the small base station 200, the reception unit 32 creates the reception state information that specifies the user data that has already been received by the mobile station 300 from the macro base station 100 and the small base station 200 and the user data that has not yet been received by the mobile station 300 from the macro base station 100 and the small base station 200. Then, the reception unit 32 outputs the created reception state information to the control unit 34.

The transmission unit 33 acquires, via the control unit 34, the reception state information created by the reception unit 32. Then, the transmission unit 33 transmits, as radio transmission, the acquired reception state information to the macro base station 100.

The control unit 34 performs the overall control of the operation of the communication unit 31 including the reception unit 32 and the transmission unit 33. Furthermore, the control unit 34 monitors the reception unit 32 and detects an error occurring in the communication with the small base station 200. The error detected here is, for example, an error indicating that desired user data is not received even after the predetermined time since the user data was received from the small base station 200, an error indicating that the number of retransmissions of the user data reaches the predetermined maximum number of retransmissions, or the like. Furthermore, if the control unit 34 detects an error occurring in the reception unit 32, the control unit 34 acquires the reception state information created by the reception unit 32 and then outputs the reception state information to the transmission unit 33.

Here, an error indicating that desired user data is not received can be detected in, for example, the PDCP layer. Specifically, if missing of reception order of the user data is detected, i.e., if it is detected that unreceived user data is present (also called out-of-order delivery), a timer is started in order to wait an arrival of a first unreceived packet. Then, if the subject packet is received before the timer has expired, it is determined that the reception has been successful; however, if the subject packet is not received, it is determined that an error occurs. After that, the same process is performed on the subsequent unreceived packets.

Furthermore, an error indicating that the number of retransmissions of the user data reaches the predetermined maximum number of retransmissions can be detected in, for example, the RLC layer. Specifically, in the RLC layer, retransmission (Automatic Repeat Request) control is prescribed, the retransmission related to the user data in which an error occurs in the radio transmission is performed. If the retransmission is successful within a predetermined number of times, it is determined that the reception has been successful; however, if the number of retransmissions exceeds the predetermined number of times, it is determined that an error occurs. In this case, conventionally, it is determined that a Radio Link Failure (RLF) has occurred and RRC reconnection (RRC Connection Re-establishment) is performed. Furthermore, in the dual connectivity, in particular, the RLF occurs on the small base station 200 side, the RRC reconnection is not performed; however, the communication failure (RLC failure) in the RLC layer is transmitted to the macro base station 100 as a notification. Furthermore, as described in the first embodiment, the communication failure in the RLC layer can be detected by the RLC on the downlink transmission side and the RLC on the downlink reception side.

In the embodiment, if these errors are detected, the reception state information is transmitted from the mobile station 300 to the macro base station 100. Consequently, the reception state information can promptly be transmitted to the macro base station 100 when compared with the technology in which the reception state information is transmitted when an amount of retention in the buffer in, for example, the mobile station 300 exceeds a predetermined threshold. Furthermore, if a large amount of loss of user data is detected in the PDCP layer, the timer is expired for each lost packet, the reception state information is accordingly transmitted, and thus the signaling overhead is increased. Therefore, for example, a prohibit timer (Prohibit Timer) may also separately be set such that reception state information is not frequently transmitted. Specifically, it is determined, by using the prohibit timer, whether a certain period of time has elapsed since the reception state information was transmitted last time and it may also perform control such that the reception state information is not transmitted again during the time period for which the certain period of time has not elapsed.

[Process Performed in the Radio Communication System]

Figure 3:
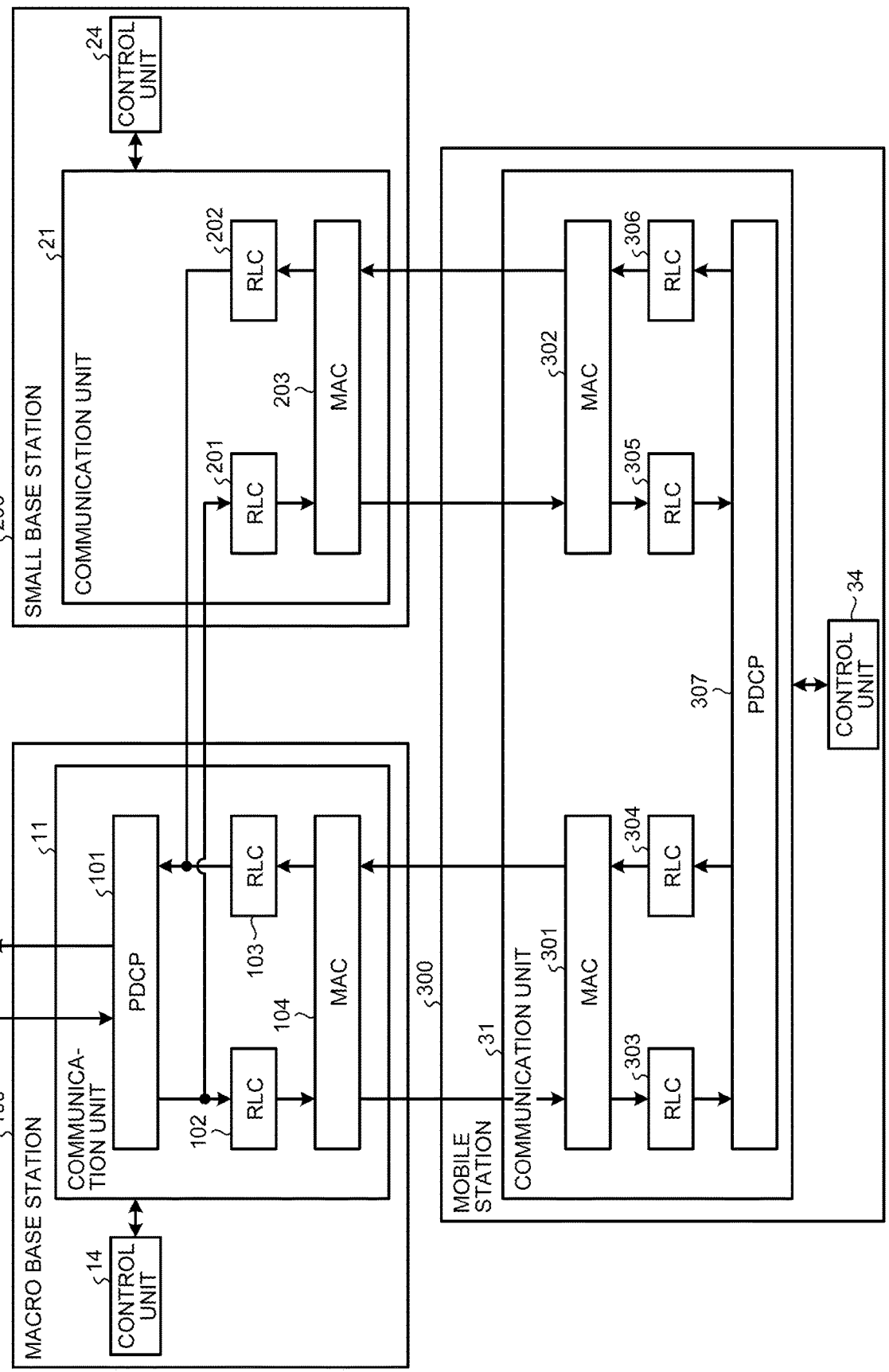
FIG. 3 is a block diagram illustrating the layer configuration of a radio communication system according to a second embodiment.

In the following, a description will be given of the process performed, in the radio communication system, by the macro base station 100, the small base station 200, and the mobile station 300. The macro base station 100, the small base station 200, and the mobile station 300 perform communication by using the link layer protocols associated with a plurality of link layers. Namely, for example, the link layer protocols associated with the Packet Data Convergence Protocol (PDCP) layer, the Radio Link Control (RLC) layer, the Medium Access Control (MAC) layer, the Physical (PHY) layer, and the like are used. FIG. 3 is a block diagram illustrating the layer configuration of a radio communication system according to a second embodiment.

Here, first, a process performed by the macro base station 100 related to transmitting and receiving user data will be described. As illustrated in FIG. 3, the communication unit 11 in the macro base station 100 includes a PDCP layer 101, an RLC layer 102, an RLC layer 103, and a MAC layer 104. The RLC layer 102 is an RLC layer for the downlink and the RLC layer 103 is an RLC layer for the uplink. Furthermore, the macro base station 100 may also include a layer, which is not illustrated, such as the PHY layer or the like.

The communication unit 11 receives user data from the higher layer communication device 4. Then, the communication unit 11 adds, in the PDCP layer 101, sequence numbers to the packets in the received user data. At this time, the communication unit 11 adds an odd number to the packet that is output to, for example, the RLC layer 102 and adds an even number to the packet that is transmitted to the small base station 200. These sequence numbers are also used at the time of, for example, handover or the like. Furthermore, the communication unit 11 performs, in the PDCP layer 101, header compression, a security check, and encryption with respect to the user data.

Then, the communication unit 11 outputs, from the PDCP layer 101 to the RLC layer 102, the packets to each of which the odd number is added. Furthermore, the communication unit 11 transmits, to the small base station 200 via the wired connection, the packets to each of which the even number is added. Consequently, for example, the packets to which sequence numbers #1, #3, #5, #7, and . . . are added are output to the RLC layer 102 and the packets to which the sequence numbers #2, #4, #6, #8 and . . . are added are transmitted to the small base station 200.

Furthermore, the numbers that are added to the packets are not always the sequence numbers in ascending order. Namely, other numbers or the like may also be added to the packets as long as each of the packets can be identified and identifiers indicate the order of all of the packets in the user data. In the following, a description will continuously be given with the assumption that the continuous sequence numbers in ascending order are added to the packets.

The communication unit 11 acquires, in the RLC layer 102 from the PDCP layer 101, the packets to each of which an odd number is added. Then, the communication unit 11 divides or integrates, in the RLC layer 102 as needed, the packets and adds a header of the RLC layer, whereby the communication unit 11 creates the packets of the RLC layer (hereinafter, referred to as "RLC packets").

Then, the communication unit 11 outputs the RLC packets from the RLC layer 102 to the MAC layer 104 in accordance with the scheduling that is set in the MAC layer 104. Then, the communication unit 11 assembles, in the MAC layer 104 by using the RLC packets, data for transmission. Namely, for example, by dividing or integrating the RLC packets as needed and by adding a header of the MAC layer, the packets of the MAC layer (hereinafter, referred to as "MAC packets") are created. Then, the communication unit 11 transmits the MAC packets in accordance with the scheduling from the MAC layer 104 to the mobile station 300 via a PHY layer or the like that is not illustrated.

In contrast, when user data is received from the mobile station 300, the communication unit 11 receives, in the MAC layer 104, the user data from the mobile station 300. Then, the communication unit 11 reconstructs (reassembles), in the MAC layer 104, the received user data and divides or integrates, in the RLC layer 103, the received user data. Furthermore, the communication unit 11 corrects, in the RLC layer 103, the order of pieces of the data by using the header of the RLC layer and outputs the user data from the RLC layer 103 to the PDCP layer 101.

In the following, a process performed by the macro base station 100 when the error detection notification is received from the small base station 200 will be described.

If an error is detected in the small base station 200, the communication unit 11 acquires, in the PDCP layer 101, the error detection notification transmitted from the small base station 200. Furthermore, the communication unit 11 acquires, in the PDCP layer 101, the reception state information that is transmitted from the mobile station 300 via the MAC layer 104 and the RLC layer 103. The reception state information includes information that can specify, at the time point at which an error is detected, the packet that has already been received by the mobile station 300 and the packet that has not yet been received by the mobile station 300.

If the error detection notification is received by the communication unit 11, the control unit 14 decides to release the dual connectivity that is set with the mobile station 300 and switch to the single connectivity. Then, the control unit 14 transmits a dual connectivity release notification indicating a release of the dual connectivity to the small base station 200 and the mobile station 300 via the communication unit 11. Furthermore, the control unit 14 refers to the reception state information received by the communication unit 11 and notifies the PDCP layer 101 of the packets that are to be transmitted to the mobile station 300. Namely, the control unit 14 notifies the PDCP layer 101 of the sequence numbers of the packets that have not yet been received by the mobile station 300 and that are indicated by the reception state information and then notifies the PDCP layer 101 of the sequence numbers of the packets that have already been received as the sequence numbers of the packets that are not needed to be transmitted.

Then, while excluding the packets that have already been received by the mobile station 300 and that are not needed to be transmitted, the communication unit 11 outputs, from the PDCP layer 101 to the RLC layer 102, the packets that have not yet been received by the mobile station 300 with sequence numbers in ascending order. Then, the communication unit 11 creates, in the RLC layer 102, the RLC packets; creates, in the MAC layer 104, the MAC packets; and transmits the MAC packets to the mobile station 300. Consequently, after having been switched from the dual connectivity to the single connectivity, the mobile station 300 can receive the packets without duplication and loss.

In the following, a process performed by the small base station 200 related to transmitting and receiving user data will be described. As illustrated in FIG. 3, the communication unit 21 in the small base station 200 includes an RLC layer 201, an RLC layer 202, and a MAC layer 203. The RLC layer 201 is an RLC layer for the downlink and the RLC layer 202 is an RLC layer for the uplink. Furthermore, the small base station 200 may also include a layer, such as a PHY layer or the like, that is not illustrated.

The communication unit 21 receives, in the RLC layer 201, the packets that are transmitted from the PDCP layer 101 in the macro base station 100 via the wired connection. As described above, in the packets, the even numbers are added. Then, the communication unit 21 divides or integrates, in the RLC layer 201 as needed, the packets and adds the header of the RLC layer, whereby the communication unit 21 creates the RLC packets.

Thereafter, the communication unit 21 outputs the RLC packets from the RLC layer 201 to the MAC layer 203 in accordance with the scheduling that is set in the MAC layer 203. Then, the communication unit 21 assembles, in the MAC layer 203, data for transmission by using the RLC packets. Namely, for example, by dividing or integrating the RLC packets as needed and by adding the header of the MAC layer, the MAC packets are created. Then, the communication unit 21 transmits the MAC packets in accordance with the scheduling from the MAC layer 203 to the mobile station 300 via the PHY layer or the like that is not illustrated.

In contrast, when user data is received from the mobile station 300, the communication unit 21 receives, in the MAC layer 203, the user data from the mobile station 300. Then, the communication unit 21 reconstructs (reassembles), in the MAC layer 203, the received user data and divides or integrates, in the RLC layer 202, the received user data. Furthermore, the communication unit 21 corrects, in the RLC layer 202, the order of the pieces of the data by using the header of the RLC layer and transmits the user data from the RLC layer 202 to the macro base station 100.

In the following, a process performed by the small base station 200 when an error is detected will be described.

If the MAC packets are transmitted from the MAC layer 203 to the mobile station 300, the control unit 24 starts the timer that measures the predetermined time and waits the reception confirmation (ACK) received from the mobile station 300. At this time, if the MAC packets are not correctly received by the mobile station 300, the reception confirmation (ACK) is not received by the time at which the timer is expired. Consequently, if the reception confirmation (ACK) is not received by the time at which the timer is expired, the control unit 24 detects that an error has occurred.

Furthermore, the control unit 24 monitors the number of retransmissions of data between the mobile station 300 and, if the number of retransmissions reaches the predetermined maximum number of retransmissions, the control unit 24 may also detects that an error has occurred. Furthermore, if a desired packet is not received after the predetermined time has elapsed since a packet was received from the macro base station 100 via the wired connection, the control unit 24 may also detects an error has occurred. If the control unit 24 detects an error, the communication unit 21 transmits an error detection notification to the macro base station 100 via the wired connection.

Thereafter, if it is decided by the macro base station 100 that the dual connectivity is released, the communication unit 21 receives a dual connectivity release notification from the macro base station 100. After the dual connectivity release notification is received, because the radio communication between the small base station 200 and the mobile station 300 is not performed, the communication unit 21 stops transmitting and receiving the data.

In the following, a process performed by the mobile station 300 related to transmitting and receiving the user data will be described. As illustrated in FIG. 3, the communication unit 31 in the mobile station 300 includes MAC layers 301 and 302, RLC layers 303 to 306, and a PDCP layer 307. Because the mobile station 300 has a function of simultaneously receiving user data from two base stations, the MAC layers and the RLC layers are provided in association with each of the base stations. Namely, the MAC layer 301, the RLC layer 303, the RLC layer 304, and the PDCP layer 307 are used to transmit and receive user data to and from the macro base station 100. Furthermore, the MAC layer 302, the RLC layer 305, the RLC layer 306, and the PDCP layer 307 are used to transmit and receive user data to and from the small base station 200. The RLC layers 303 and 305 are RLC layers for the downlink and the RLC layers 304 and 306 are RLC layers for the uplink. Furthermore, the mobile station 300 may also include a layer, which is not illustrated, such as the PHY layer or the like.

The communication unit 31 receives, in the MAC layer 301, user data (MAC packet) from the macro base station 100. Then, the communication unit 31 reconstructs (reassembles), in the MAC layer 301, the received user data and divides and integrates, in the RLC layer 303, the received user data. Furthermore, the communication unit 31 corrects, in the RLC layer 303, the order of pieces of data by using the header of the RLC layer and outputs the user data from the RLC layer 303 to the PDCP layer 307. Then, the communication unit 31 releases, in the PDCP layer 307, the decoding, the security check, and the header compression with respect to the user data.

Similarly, the communication unit 31 receives, in the MAC layer 302, the user data (MAC packet) from the small base station 200. Then, the communication unit 31 reconstructs (reassembles), in the MAC layer 302, the received user data and divides and integrates, in the RLC layer 305, the received user data. Furthermore, the communication unit 31 corrects, in the RLC layer 305, the order of pieces of data by using the header of the RLC layer and outputs the user data from the RLC layer 305 to the PDCP layer 307. Then, the communication unit 31 releases, in the PDCP layer 307, the decoding, the security check, and the header compression performed on the user data.

In contrast, when the user data is transmitted to the macro base station 100 and the small base station 200, the communication unit 31 adds, in the PDCP layer 307, the sequence numbers to the packets in the user data. Furthermore, the communication unit 31 performs, in the PDCP layer 307, the header compression, the security check, and the encryption on the user data.

Then, the communication unit 31 outputs some packets from the PDCP layer 307 to the RLC layer 304 and outputs the rest of packets from the PDCP layer 307 to the RLC layer 306. Then, in the RLC layers 304 and 306, by dividing or integrating the packets as needed and by adding the header of the RLC layer, the communication unit 31 creates the packets of the RLC layer (hereinafter, referred to as "RLC packets").

Then, the communication unit 31 outputs the RLC packets from the RLC layers 304 and 306 to the MAC layers 301 and 302 in accordance with the scheduling that is set in the MAC layers 301 and 302. Then, the communication unit 31 assembles, in the MAC layers 301 and 302, the pieces of data for transmission by using the RLC packets. Namely, for example, by dividing or integrating the RLC packets as needed and by adding the header of the MAC layers, the MAC packets are created. Then, the communication unit 31 transmits, in accordance with the scheduling, the MAC packets from the MAC layers 301 and 302 to the macro base station 100 and the small base station 200 via the PHY layer or the like that is not illustrated.

In the following, a process performed by the mobile station 300 when an error is detected will be described.

The control unit 34 monitors reception of user data in the communication unit 31 and, if, for example, even if the predetermined time has elapsed after the packets to each of which a sequence number is added were received, a packet that has not yet been received and that has a sequence number that is previous to that added to the already received packets is present in the PDCP layer 307, the control unit 34 detects that an error has occurred. Furthermore, the control unit 34 monitors the number of retransmissions of data between the macro base station 100 and each of the small base stations 200 and, if the number of retransmissions reaches the predetermined maximum number of retransmissions, the control unit 34 may also detect that an error has occurred. Then, if an error is detected at the reception of data transmitted from the small base station 200, the control unit 34 instructs the communication unit 31 to create reception state information.

The communication unit 31 that has received the instruction acquires, in the PDCP layer 307, the sequence numbers that are added to the already received packets. Namely, because sequence numbers added in the PDCP layer 101 of the macro base station 100 are added to each of the packets, the sequence number added by the macro base station 100 is acquired in the PDCP layer 307. Then, the communication unit 31 confirms, in the PDCP layer 307 from the acquired sequence number, the sequence numbers of the packets that have not yet been received.

Then, the communication unit 31 creates, in the PDCP layer 307, reception state information that indicates the smallest sequence number from among the sequence numbers of the packets that have not yet been received and that indicates whether the predetermined number of packets to which the sequence numbers subsequent to the smallest sequence number are added have been received. Specifically, for example, considering the case in which the packets with the sequence numbers #1, #3, #5, and #7 are transmitted from the macro base station 100 and the packets with the sequence numbers #2, #4, #6, and #8 are transmitted from the small base station 200. Here, for example, it is assumed that the packet with the sequence number #2 transmitted from the small base station 200 is not received by the mobile station 300 and an error is detected. In this case, the packets with the sequence numbers #1, #3, #5, and #7 transmitted from the macro base station 100 are received by the mobile station 300 and the packets with the sequence numbers #2, #4, #6, and #8 are not received by the mobile station 300.

Thus, in the PDCP layer 307, the reception state information that indicates the smallest sequence number #2 from among the sequence numbers added to the packets that have not yet been received and that indicates whether the packets with the sequence numbers #3 to #8 have been received. Accordingly, here, the reception state information that indicates that the packets with the sequence numbers #3, #5, and #7 have already been received and that indicates that the packets with the sequence numbers #4, #6, and #8 have not yet been received is created. The reception state information indicates that the sequence numbers #2, #4, #6, and #8 have not yet been received by the mobile station 300 and need to be transmitted again from the macro base station 100 after switching to the single connectivity.

Furthermore, the above description has been given with the assumption that the continuous sequence numbers in ascending order are added to the packets in the PDCP layer 101. However, as described above, in the PDCP layer 101, the sequence numbers are not always needed to be added to the packets. If other identifiers are added to the packets in the PDCP layer 101, the reception state information includes the identifier of the packet (a first unreceived packet) closest to the top from among unreceived packets in the entire user data. Furthermore, the reception state information in this case includes information indicating whether the predetermined number of packets that are subsequent to the packet that is closest to the top in the entire user data have been received.

When the reception state information is created in the PDCP layer 307, the communication unit 31 transmits the reception state information to the macro base station 100. Consequently, in the macro base station 100, including the packets that go through the small base station 200, it is possible to be aware of the reception state of the packets in the mobile station 300. Consequently, the macro base station 100 can transmit the packets with the proper quantity to the mobile station 300 even after releasing the dual connectivity and switching to the single connectivity and can prevent duplication and loss of user data.

[Specific Example of the Reception State Information]

As described above, if an error is detected in the communication between the small base station 200 and the mobile station 300, the reception state information is transmitted from the mobile station 300 to the macro base station 100. For this reception state information, for example, a PDCP status report (hereinafter, referred to as a "PDCP SR") can be used.

Figure 4:
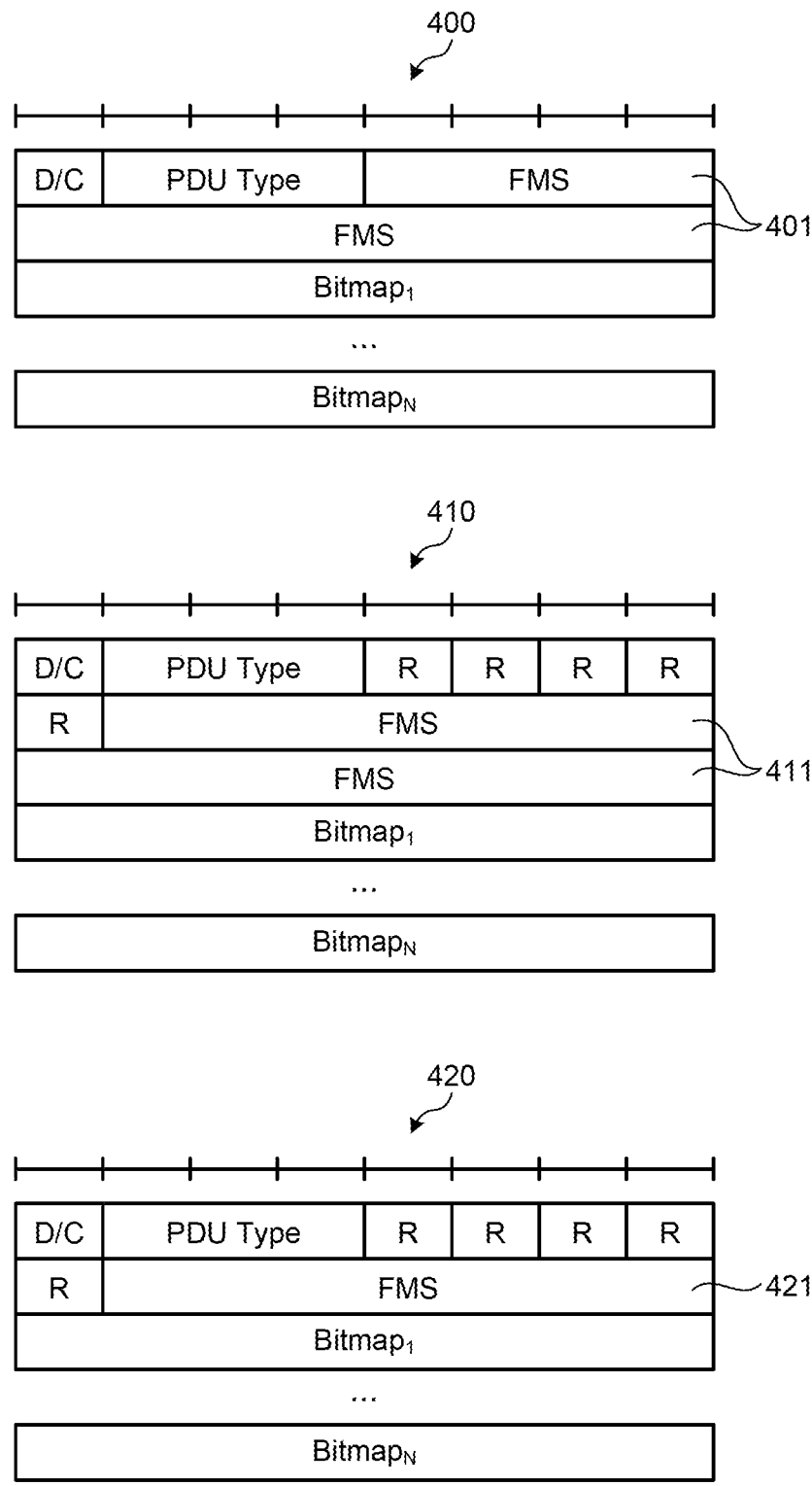
FIG. 4 is a schematic diagram illustrating a specific example of the format of a PDCP SR.

FIG. 4 is a schematic diagram illustrating a specific example of the format of PDCP SR. A PDCP SR 400 indicated on the upper portion illustrated in FIG. 4 is a PDCP SR for a 12-bit sequence number. Furthermore, the PDCP SR 410 indicated on the medium portion illustrated in FIG. 4 is a PDCP SR for a 15-bit sequence number. Furthermore, the PDCP SR 420 indicates on the lower portion illustrated in FIG. 4 is a PDCP SR for a 7-bit sequence number.

As indicated in the drawings, in the PDCP SR, the size of the sequence number is different depending on the data that is transmitted and received. Specifically, for example, in Voice of Internet Protocol (VoIP) or the like, a 7-bit sequence number is sometimes used. Consequently, each of the PDCP SRs 400, 410, and 420 illustrated in FIG. 4 has a First Missing Sequence number (FMS) fields 401, 411, and 421 with different sizes. The FMS fields 401, 411, and 421 are the fields that store therein the sequence number of the packet closest to the top in the entire of the user data from among the unreceived packets.

Namely, for example, in the PDCP SR 400, the sequence number of the packet that is closest to the top in the entire of the user data from among the unreceived packets is stored in the FMS field 401 by the mobile station 300. In other words, in the FMS field 401, from among the packets in the user data that have not yet been received by the small base station 200, the sequence number of the packet that is to be received earliest is stored. In the following, the packets in which sequence numbers are stored in the FMS fields 401, 411, and 421 are sometimes referred to as the "FMS packets".

Furthermore, the fields of $Bitmap_1$ to $Bitmap_N$ in the PDCP SRs 400, 410, and 420 store therein reception status indicating whether the packets that are subsequent to the FMS packet have been received. Specifically, for example, regarding the $1^{st}$ to the $N^{th}$ (N is an integer equal to or greater than 1) packets after the FMS packets, if a subject packet is received by the mobile station 300, "1" is stored and, if the subject packet is not received by the mobile station 300, "0" is stored.

For example, as the example described above, considering the case in which the packets with the sequence numbers #1, #3, #5, and #7 are transmitted from the macro base station 100 and the packets with the sequence numbers #2, #4, #6, and #8 are transmitted from the small base station 200. Here, if the packet with the sequence number #2 is not received by the mobile station 300 and an error is detected, the packet with the subsequent sequence numbers #4, #6, and #8 are not also received from the small base station 200. Consequently, in the mobile station 300, the packets with the sequence numbers #1, #3, #5, and #7 have already been received and the packets with the sequence numbers #2, #4, #6, and #8 have not yet been received.

In this case, because the FMS packet is the packet with the sequence number #2, in the FMS fields 401, 411, and 412 in the PDCP SRs 400, 410, and 420, respectively, the sequence number #2 is stored. Furthermore, regarding the packets after the FMS packet, the packets with the sequence numbers #3, #5, and #7 have already been received and the packets with the sequence numbers #4, #6, and #8 have not yet been received. Consequently, "1", "0", "1", "0", "1", and "0" are stored in the respective fields of $Bitmap_1$ to $Bitmap_6$.

Furthermore, in the PDU Type field in each of the PDCP SRs 400, 410, and 420 illustrated in FIG. 4, information related to the type of the Protocol Data Unit (PDU) used as the PDCP SRs 400, 410, and 420 is stored. Specifically, for example, as illustrated in FIG. 5, the bit that represents the type of this PDU is stored in the PDU Type field. Namely, if the bits of "000" are stored in the PDU Type field, this indicates that this PDU is the PDCP status report, such as the PDCP SRs 400, 410, and 420.

In contrast, if the bits of "001" are stored in the PDU Type field, this indicates that this PDU is a scattering ROHC feedback packet (Interspersed ROHC feedback packet). The Interspersed ROHC feedback packet includes therein feedback information with respect to the PDU in the PDCP layer transmitted from the reception side.

Furthermore, the bits of "010" to "111" that are possibly be stored in the PDU Type field remain as reserved bits. Accordingly, in the embodiment, in the reception state information that is transmitted from the mobile station 300 when an error is detected, it is also possible to allocate a bit that is different from the normal PDCP SR and store the bit in the PDU Type field.

[Connection Switching Method]

Figure 6:
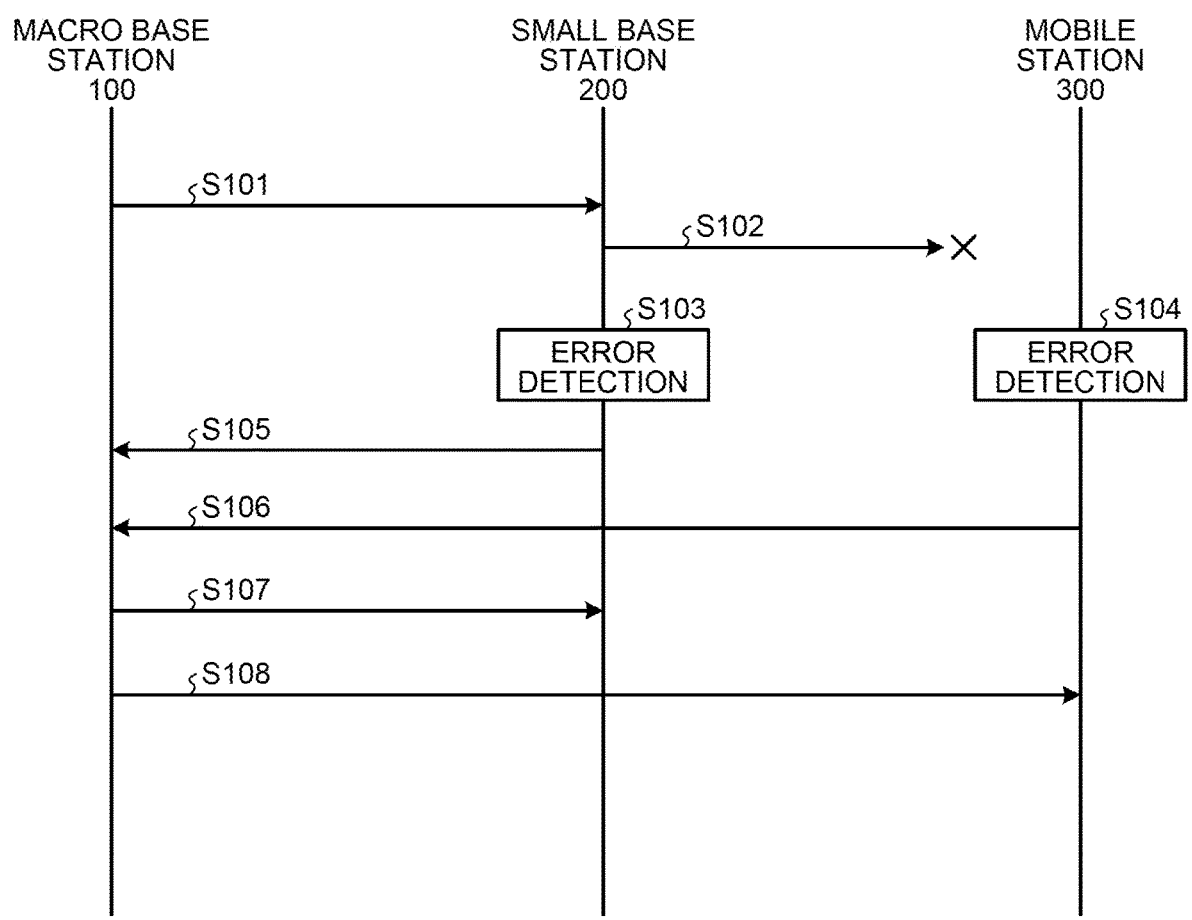
FIG. 6 is a sequence diagram illustrating a connection switching method according to the second embodiment.

In the following, a method of switching a connection from the dual connectivity to the single connectivity according to the second embodiment will be described with reference to the sequence diagram illustrated in FIG. 6.

When the mobile station 300 performs dual connectivity with the macro base station 100 and the small base station 200, a part of the user data is transmitted, as radio transmission, from the communication unit 11 in the macro base station 100 to the mobile station 300. Furthermore, the rest of the user data is transmitted to the small base station 200 via the wired connection (Step S101) and transmitted, as radio transmission, from the communication unit 21 in the small base station 200 to the mobile station 300. For the packets of these pieces of the user data, the sequence numbers indicating the order of the pieces of the data are attached in the communication unit 11 in the macro base station 100 and, for example, the packets to each of which an odd number is added are directly transmitted, as radio transmission, to the mobile station 300 from the macro base station 100 and the packets to each of which an even number is added are transmitted, as radio transmission, to the mobile station 300 via the small base station 200.

Then, if the packets transmitted, as the radio transmission, from the small base station 200 is not received by the mobile station 300 (Step S102), an error is detected by the control unit 24 in the small base station 200 (Step S103). This error is detected when, for example, a reception confirmation (ACK) with respect to the packets transmitted, as the radio transmission, from the small base station 200 are not transmitted back from the mobile station 300. Furthermore, an error is also detected by the control unit 24 in the small base station 200 in a case in which the number of retransmissions with the mobile station 300 reaches the predetermined maximum number of retransmissions, a case in which a subsequent packet is not received even after the predetermined time has elapsed since a packet was received from the macro base station 100, or the like.

In contrast, if a packet from the small base station 200 is not received, an error is also detected by the control unit 34 in the mobile station 300 (Step S104). This error is detected in a case in which, for example, even after the predetermined time has elapsed since the packets to each of which a sequence number is added were received from the small base station 200, an unreceived packet to which a sequence number that is previous to that added to the received packets is present. Furthermore, an error is also detected by the control unit 34 in the mobile station 300 in a case in which the number of retransmissions with the small base station 200 reaches the predetermined maximum number of retransmissions, or the like.

If an error is detected by the control unit 24 in the small base station 200, an error detection notification is transmitted to the macro base station 100 (Step S105). Furthermore, if an error is detected by the control unit 34 in the mobile station 300, reception state information is created by the communication unit 31. The reception state information includes therein a sequence number of the packet that is closest to the top in the order of the packets that have not yet been received by the mobile station 300 and includes therein the reception status indicating whether the predetermined number of packets that are subsequent to the packet that is closest to the top packet have been received. Then, the created reception state information is transmitted from the communication unit 31 in the mobile station 300 to the macro base station 100 (Step S106).

In the macro base station 100, in response to the error detection notification transmitted form the small base station, it is decided by the control unit 14 that the dual connectivity is temporarily released and is switched to the single connectivity. Namely, it is decided that transmission of user data via the small base station 200 is temporarily stopped and all of the pieces of the user data are directly transmitted to the mobile station 300 by the macro base station 100. Then, a dual connectivity release notification indicating the release of the dual connectivity is transmitted to the small base station 200 by the communication unit 11 (Step S107). The small base station 200 that has received the dual connectivity release notification stops, after that, the transmission of the user data with respect to the mobile station 300.

Furthermore, the dual connectivity release notification is also transmitted from the communication unit 11 in the macro base station 100 to the mobile station 300 (Step S108). The mobile station 300 that has received the dual connectivity release notification receives, after that, all of the pieces of the user data from the macro base station 100.

After having switched to the single connectivity, if the macro base station 100 transmits the user data to the mobile station 300, the reception state information received from the control unit 14 is referred to by the mobile station 300. Then, the sequence numbers of the packets that have not yet been received by the mobile station 300 are transmitted, as a notification, from the control unit 14 to the communication unit 11 and the packets with the notified sequence numbers are sequentially transmitted from the communication unit 11 to the mobile station 300.

In this way, in the embodiment, if an error is detected in a transmission path for the user data via the small base station 200, the reception state information is transmitted from the mobile station 300 to the macro base station 100. Then, the macro base station 100 releases the dual connectivity and refers to the reception state information and transmits the user data that has not yet been received by the mobile station 300 to the mobile station 300 with the proper quantity. Consequently, even when switching from the dual connectivity to the single connectivity occurs, it is possible to prevent duplication and loss of user data that is to be received by the mobile station 300.

[Specific Example of a Process Performed by the Mobile Station at the Time of Error Detection]

Figure 7:
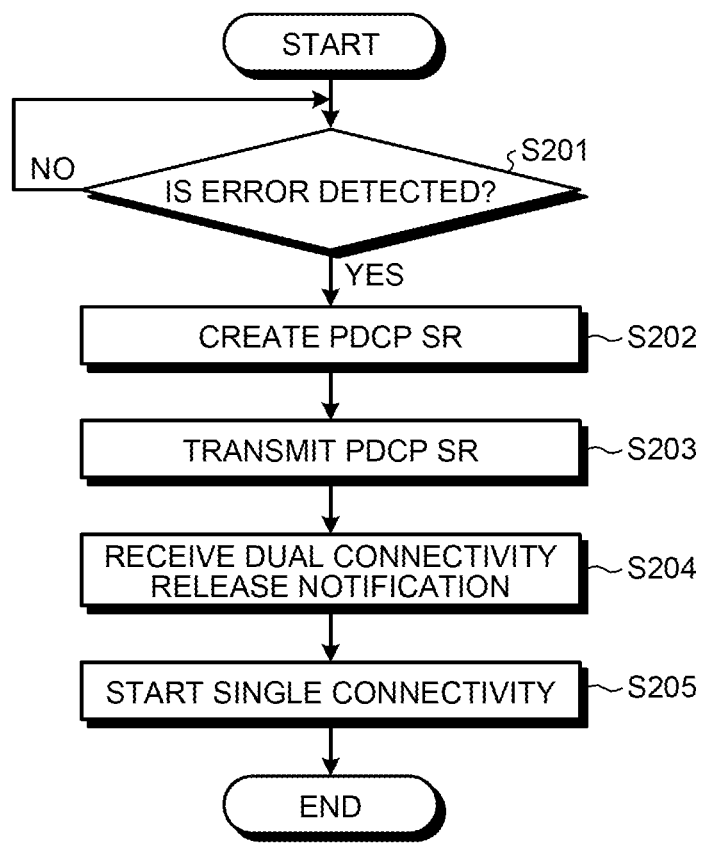
FIG. 7 is a flowchart illustrating a process performed by a mobile station according to the second embodiment.

In the following, a process performed by the mobile station 300 when an error is detected, at the time of dual connectivity, in a transmission path via the small base station 200 will be described with reference to the flowchart illustrated in FIG. 7.

The control unit 34 in the mobile station 300 monitors communication between the small base station 200 and the mobile station 300 and determines whether an error has occurred (Step S201). Namely, if the packets to each of which a sequence number is added are received from the small base station 200, the control unit 34 determines whether an unreceived packet with a sequence number that is previous to that added to the received packet is present. Then, if an unreceived packet is present, the control unit 34 starts a predetermined timer and determines whether the unreceived packet is received before the predetermined time has elapsed. As the result of the determination, if an unreceived packet is not present or the packet is correctly received before the predetermined time has elapsed, the control unit 34 determines that no error is detected (No at Step S201) and continuously monitors the communication.

Then, if an error is detected (Yes at Step S201), the control unit 34 instructs the communication unit 31 to create a PDCP SR that is reception state information. In response to this instruction, the communication unit 31 creates a PDCP SR that includes therein a sequence number of the packet that is the closest to the top from among unreceived packets in the entire user data and that includes therein a reception status indicating whether the predetermined number of packets that are subsequent to the packet that is the closest to the top packet have been received (Step S202). Then, the communication unit 31 transmits the created PDCP SR to the macro base station 100 (Step S203).

Thereafter, the communication unit 31 receives a dual connectivity release notification from the macro base station 100 indicating that the dual connectivity is decided to be temporarily released (Step S204). After receiving the dual connectivity release notification, the communication unit 31 starts the single connectivity with the macro base station 100 (Step S205) and receives, from the macro base station 100, all of the pieces of the user data addressed to the mobile station 300. At this time, because the macro base station 100 refers to the PDCP SR and transmits the user data that has not yet been received by the mobile station 300 with the proper quantity, the communication unit 31 receives the user data from the macro base station 100 without duplication and loss.

As described above, according to the embodiment, if an error is detected, at the time of dual connectivity, in the transmission path via the small base station, the mobile station transmits, to the macro base station, the reception state information that specifies an unreceived packet and a received packet. Then, the macro base station releases the dual connectivity, switches to the single connectivity, refers to the reception state information, and transmits the packets that have not yet been received by the mobile station. Consequently, even if switching of connection occurs, it is possible to transmit packets with the proper quantity from the macro base station to the mobile station and it is possible to prevent duplication and loss of user data.

Furthermore, in the second embodiment, it is assumed that the error detection notification is transmitted from the small base station 200 to the macro base station 100; however, the error detection notification may also be transmitted from the mobile station 300 to the macro base station 100. In this case, the error detection notification may also be transmitted to the macro base station 100 together with the reception state information.

Third Embodiment

In the second embodiment, a description has been given of the connection switching method performed in a case in which an error is detected in a downlink from the macro base station 100 and the small base station 200 toward the mobile station 300. However, in also a case in which an error is detected in an uplink from the mobile station 300 toward the macro base station 100 and the small base station 200, it is also possible to temporarily release the dual connectivity and switch to the single connectivity. Thus, in the third embodiment, a description will be given of a connection switching method performed in a case in which an error is detected in an uplink.

The configuration of the radio communication system according to the embodiment is the same as that described in the second embodiment; therefore, descriptions thereof will be omitted. The embodiment differs from the second embodiment in that an error is detected when a packet transmitted from the mobile station 300 to the small base station 200 is not received by the macro base station 100.

Figure 8:
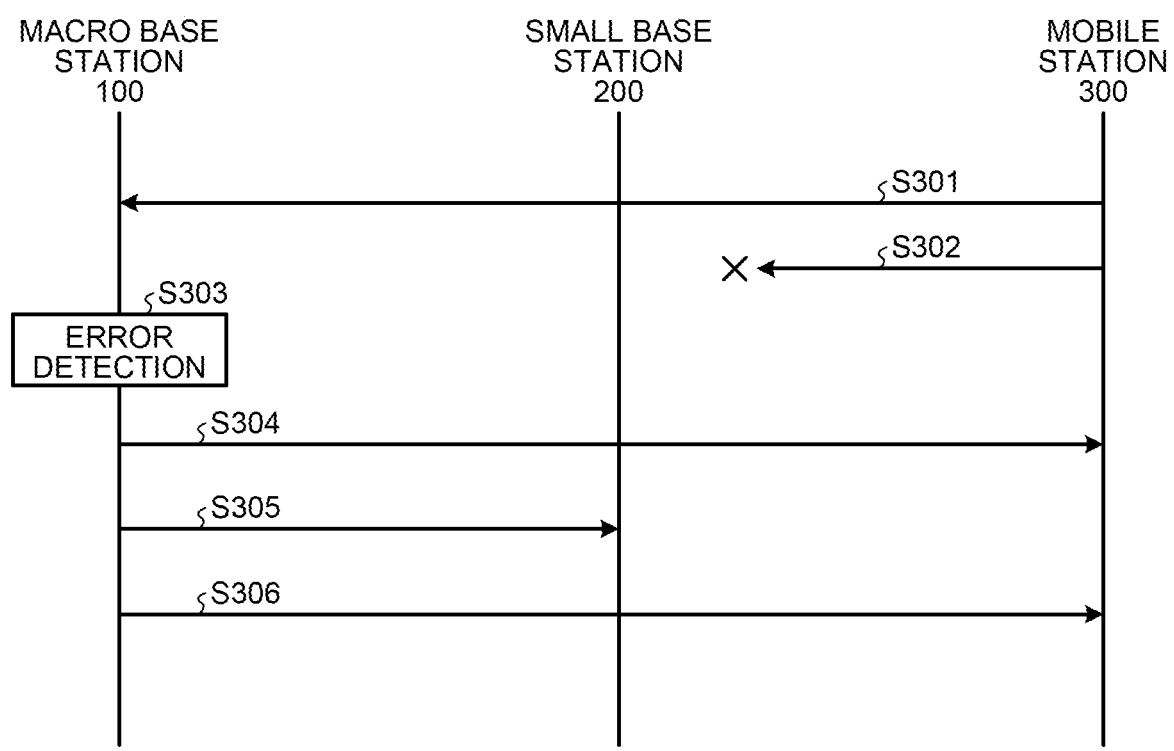
FIG. 8 is a sequence diagram illustrating a connection switching method according to a third embodiment.

FIG. 8 is a sequence diagram illustrating a connection switching method according to a third embodiment. As illustrated in FIG. 8, when the mobile station 300 performs the dual connectivity with the macro base station 100 and the small base station 200, a part of the user data is directly transmitted, as radio transmission, from the communication unit 31 in the mobile station 300 to the macro base station 100 (Step S301). Furthermore, the rest of the user data is transmitted to the macro base station 100 via the small base station 200.

Sequence numbers are added to these packets in the user data in the communication unit 31 in the mobile station 300 and, for example, the packets to each of which an odd number is added are directly transmitted, as radio transmission, to the macro base station 100 and the packets to each of which an even number is added are transmitted to the macro base station 100 via the small base station 200.

Then, if the packet transmitted via the small base station 200 is not received by the macro base station 100 (Step S302), an error is detected by the control unit 14 in the macro base station 100 (Step S303). This error is detected in a case in which, for example, even after the predetermined time has elapsed since the packets to each of which the sequence number is added were received from the mobile station 300 via the small base station 200, an unreceived packet with a sequence number that is previous to the sequence numbers that are added to the received packets is present. This error detection can be performed in, as described above, for example, the PDCP layer. Furthermore, this error detection can also be performed in, for example, the RLC layer, and in a case in which the error detection is performed in RLC, it is also possible to detect an error by the small base station 200 or the mobile station 300. If an error is detected by the small base station 200 or the mobile station 300, a notification indicating the occurrence of an error is transmitted to the macro base station 100.

If an error is detected by the control unit 14 in the macro base station 100, the reception state information is created by the communication unit 11. The reception state information includes therein a sequence number of the packet that is closest to the top from among the packets, in the entire user data, that have not yet been received by the macro base station 100 and includes therein the reception status indicating whether the predetermined number of packets subsequent to the unreceived packet closest to the top have been received. Then, the created reception state information is transmitted from the communication unit 11 in the macro base station 100 to the mobile station 300 (Step S304).

Furthermore, in the macro base station 100, because an error is detected by the control unit 14, it is decided that the dual connectivity is temporarily released and is switched to the single connectivity. Namely, it is decided that reception of the user data via the small base station 200 is temporarily stopped and decided that all of the pieces of the user data are directly transmitted from the mobile station 300 to the macro base station 100. Then, the dual connectivity release notification indicating that the dual connectivity is released is transmitted to the small base station 200 by the communication unit 11 (Step S305). The small base station 200 that has received the dual connectivity release notification stops, after that, reception of the user data transmitted from the mobile station 300.

Furthermore, the dual connectivity release notification is also transmitted from the communication unit 11 in the macro base station 100 to the mobile station 300 (Step S306). The mobile station 300 that has received the dual connectivity release notification directly transmits, after that, as radio transmission, all of the pieces of the user data to the macro base station 100.

After having switched to the single connectivity, when the mobile station 300 transmits the user data to the macro base station 100, the reception state information received form the macro base station 100 is referred to by the control unit 34. Then, the sequence numbers of the packets that have not been received by the macro base station 100 are transmitted, as a notification, from the control unit 34 to the communication unit 31 and the packets with the notified sequence numbers are sequentially transmitted from the communication unit 31 to the macro base station 100.

As described above, in the embodiment, if an error is detected in the transmission path of the user data via the small base station 200, the reception state information is transmitted from the macro base station 100 to the mobile station 300. Then, after the macro base station 100 releases the dual connectivity, the mobile station 300 refers to the reception state information and transmits the user data that has not yet been received by the macro base station 100 to the macro base station 100 with the proper quantity. Consequently, even when switching from the dual connectivity to the single connectivity occurs, it is possible to prevent duplication and loss of user data that is to be received by the macro base station 100.

As described above, according to the embodiment, if an error is detected in the transmission path via the small base station at the time of dual connectivity, the macro base station transmits, to the mobile station, the reception state information that specifies unreceived packets and received packets. Then, if the macro base station releases the dual connectivity and switches to the single connectivity, mobile station refers to the reception state information and transmits the packet that has not been received by the macro base station. Consequently, even if switching of connection occurs, it is possible to transmit packets with the proper quantity from the mobile station to the macro base station and it is possible to prevent duplication and loss of user data.

Furthermore, in the third embodiment described above, an error is detected by the macro base station 100; however, an error may also be detected by, for example, the small base station 200 or the mobile station 300. Furthermore, the small base station 200 or the mobile station 300 that has detected the error may also notify the macro base station 100 of the occurrence of the error. The small base station 200 detects an error in a case in which, for example, the number of retransmissions with the mobile station 300 in the RLC layer reaches the predetermined maximum number of retransmissions, or the like. Furthermore, the mobile station 300 detects an error in a case in which, even after the predetermined time has elapsed since the user data was transmitted to the small base station 200, the reception confirmation (ACK) of the user data is not received from the small base station 200, or the like.

Furthermore, in each of the embodiments, an example of the dual connectivity in which the mobile station 300 simultaneously connects two base stations, i.e., the macro base station 100 and the small base station 200, has been described; however, the same process can also be performed in multiple connections in which the mobile station 300 simultaneously connects to three or more base stations. Namely, if an error is detected in a transmission path via one of the base stations, the mobile station on the reception side transmits reception state information to the primary base station to which the control plane is connected. Then, the primary base station releases the multiple connections, switches to the single connectivity, and refers to the reception state information, whereby the primary base station can transmit the user data with the proper quantity to the mobile station.

Furthermore, in each of the embodiments, if an error is detected in the transmission path via the small base station 200, the macro base station 100 decides to release the dual connectivity and switch to the single connectivity. However, if an error is detected, the macro base station 100 does not always need to switch to the single connectivity. In a case of not switching to the single connectivity, the mobile station 300 or the macro base station 100 on the reception side transmits the reception state information to the macro base station 100 or the mobile station 300 on the transmission side, whereby the transmission side can confirm the reception state of the packets on the reception side.

Furthermore, in each of the embodiments, it is assumed that, if an error is detected in the transmission path via the small base station 200, the dual connectivity is released and the connection is switched to the single connectivity; however, the occurrence of a connection switch is not limited to a case in which an error is detected. Namely, for example, it is conceivable that, in also a case in which the mobile station 300 is moved and thus the macro base station or the small base station at the connection destination is changed, the dual connectivity is temporarily released and the connection is switched to the single connectivity. Furthermore, in such a case, also, the reception side transmits the reception state information to the transmission side, whereby it is possible to prevent duplication and loss of user data at the time of the occurrence of a connection switch.

The physical configuration of the macro base station 100, the small base station 200, and the mobile station 300 in each of the embodiments does not always need to be the same block diagram as that illustrated in FIG. 2 and FIG. 3. Thus, a specific example of the hardware configuration of the macro base station 100, the small base station 200, and the mobile station 300 will be described.

Figure 9:
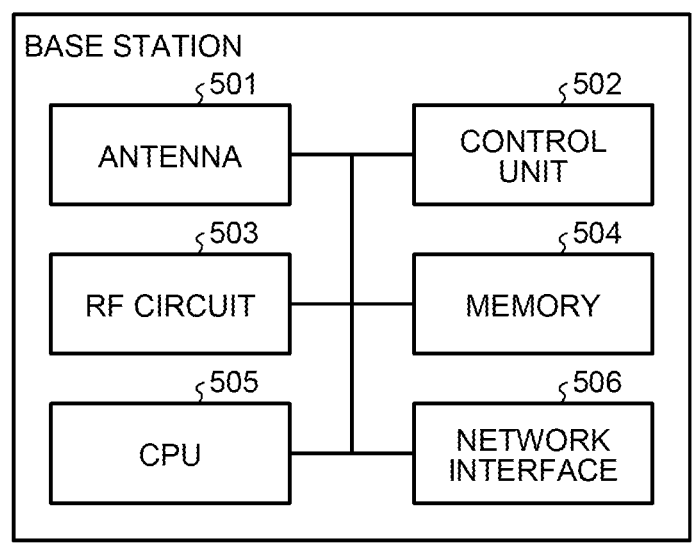
FIG. 9 is a block diagram illustrating the hardware configuration of a base station.

FIG. 9 is a block diagram illustrating the hardware configuration of a base station. The base station illustrated in FIG. 9 corresponds to, for example, the macro base station 100 and the small base station 200 and includes an antenna 501, a control unit 502, a radio frequency (RF) circuit 503, a memory 504, a CPU 505, and a network interface 506.

The control unit 502 implements the function performed by, for example, the control unit 14 in the macro base station 100 and the control unit 24 in the small base station 200.

The network interface 506 is an interface for connecting to another base station by the wired connection. For example, the macro base station 100 and the small base station 200 are connected in a wired manner via the network interface 506.

The CPU 505, the memory 504, and the RF circuit 503 implement the function performed by, for example, the communication unit 11 in the macro base station 100 and the communication unit 21 in the small base station 200. Namely, for example, in the memory 504, various kinds of programs, such as the programs for implementing the function performed by the communication unit 11 or the communication unit 21, are stored. Then, the CPU 505 reads the programs stored in the memory 504 and cooperates with the RF circuit 503 or the like, whereby implementing the function performed by the communication unit 11 or the communication unit 21.

Figure 10:
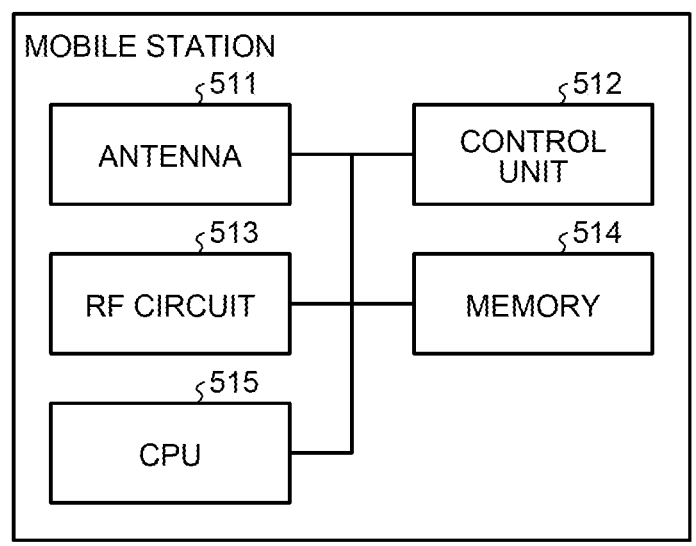
FIG. 10 is a block diagram illustrating the hardware configuration of a mobile station.

FIG. 10 is a block diagram illustrating the hardware configuration of a mobile station. The mobile station illustrated in FIG. 10 corresponds to, for example, the mobile station 300 and includes an antenna 511, a control unit 512, an RF circuit 513, a memory 514, and a CPU 515.

The control unit 512 implements the function performed by, for example, the control unit 34 in the mobile station 300.

The CPU 515, the memory 514, and the RF circuit 513 implements the function performed by, for example, the communication unit 31 in the mobile station 300. Namely, for example, in the memory 514, various kinds of programs, such as the programs for implementing the function performed by the communication unit 31. Then, the CPU 515 reads the programs stored in the memory 514 and cooperates with the RF circuit 513 or the like, whereby implementing the function performed by the communication unit 31.

According to an aspect of an embodiment of the radio communication device and the radio communication method disclosed in the present invention, an advantage is provided in that it is possible to prevent inconsistency of user data that is transmitted and received.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
   a receiver that receives a part of data transmitted from a first communication device via a first path, and that receives another part of data transmitted from the first communication device via a second path that goes through a second communication device;
   processor circuitry configured to perform communication control to change a setting of a communication path with the first communication device by a control by the first communication device according to an error detection notification, the error detection notification being transmitted from the second communication device to the first communication device and regarding data lost in an interface between the first communication device and the second communication device; and
   a transmitter that transmits, when the communication control is performed where the data is transmitted only via the first path by reconfiguring the communication path, reception state information to the first communication device via the first path, the reception state information specifying data that has already been received or data that has not yet been received.

2. The radio communication device of claim 1, wherein the receiver receives data to which an identifier indicating an order of the data is added, specifies an identifier of first unreceived data based on an identifier added to the received data and the transmitter transmits the reception state information that includes therein both the identifier of the first unreceived data and information that indicates whether a predetermined number of pieces of data to each of which an identifier indicating that the order is subsequent to the identifier of the first unreceived data has already been received.

3. The radio communication device of claim 1, wherein the processor circuitry detects that, when predetermined time has elapsed after the receiver receives the data via the second path, desired data is not received.

4. The radio communication device of claim 1, wherein the processor circuitry detects that a number of retransmissions of the data via the second path reaches a predetermined maximum number of retransmissions.

5. The radio communication device of claim 1, wherein the processor circuitry performs the communication control in accordance with the state of data communication via the second path.

6. The radio communication device of claim 1, wherein an error indicating that the data that has not yet been received is detected in the Packet Data Convergence Protocol (PDCP) layer.

7. The radio communication device of claim 1, wherein sequence numbers are added to packets in the received data in the PDCP layer.

8. The radio communication device of claim 1,
wherein the first communication device transmits a packet, in which odd numbers are added, to a Radio Link Control (RLC) layer in the first communication device, and
wherein the first communication device transmits a packet, in which even numbers are added, to a Radio Link Control (RLC) layer in the second communication device.

9. The radio communication device of claim 1, wherein some packets are transmitted from a Packet Data Convergence Protocol (PDCP) layer to a Radio Link Control (RLC) layer.

10. A radio communication device comprising:
a transmitter that transmits a part of data addressed to a first communication device via a first path, and that transmits another part of data addressed to the first communication device via a second path that goes through a second communication device;
a receiver that receives, when a communication control to change a setting of a communication path with the first communication device by a control by the radio communication device according to an error detection notification, the error detection notification being transmitted from the second communication device to the radio communication device and regarding data lost in an interface between the radio communication device and the second communication device, reception state information specifying data that has already been received by the first communication device or data that has not yet been received by the first communication device; and
processor circuitry that decides, in accordance with the reception state information received by the receiver, data that is to be transmitted from the transmitter via the first path, wherein
the processor circuitry is provided with, from the second communication device, the error detection notification and is configured to perform the communication control where the data is transmitted only via the first path by reconfiguring the communication path.

11. A radio communication system comprising:
a first communication device that transmits data;
a second communication device that receives and transmits a part of the data transmitted from the first communication device; and
a third communication device that receives data transmitted from the first communication device and the second communication device, wherein
the third communication device includes
a first receiver that receives the part of the data transmitted from the first communication device via a first path, and that receives another part of the data transmitted from the first communication device via a second path that goes through the second communication device,
first processor circuitry that is configured to perform communication control to change a setting of a communication path with the first communication device by a control by the first communication device according to an error detection notification, the error detection notification being transmitted from the second communication device to the first communication device and regarding data lost in an interface between the first communication device and the second communication device, and
a transmitter that transmits, when the communication control is performed where the data is transmitted only via the first path by reconfiguring the communication path, reception state information to the first communication device via the first path, the reception state information specifying data that has already been received or data that has not yet been received, and
the first communication device includes
a second receiver that receives the reception state information transmitted from the transmitter, and
second processor circuitry that decides, in accordance with the reception state information received by the receiver, data that is to be transmitted via the first path.

12. A radio communication method comprising:
receiving a part of data transmitted from a first communication device, via a first path and receiving another part of data transmitted from the first communication device, via a second path that goes through a second communication device;
performing communication control to change a setting of a communication path with the first communication device by a control by the first communication device according to an error detection notification, the error detection notification being transmitted from the second communication device to the first communication device and regarding data lost in an interface between the first communication device and the second communication device; and
transmitting, when the communication control is performed where the data is transmitted only via the first path by reconfiguring the communication path, reception state information to the first communication device via the first path, the reception state information specifying data that has already been received via the first path and the second path or data that has not yet been received via the first path and the second path.

* * * * *